United States Patent
Heirich et al.

(10) Patent No.: US 6,417,893 B1
(45) Date of Patent: *Jul. 9, 2002

(54) METHOD AND SYSTEM FOR SUPPORTING A CATHODE RAY TUBE DISPLAY

(75) Inventors: Douglas L. Heirich, Palo Alto; Roy S. Riccominni, Campbell, both of CA (US)

(73) Assignee: Apple Computer, Inc., Cupertino, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/072,757

(22) Filed: May 5, 1998

(51) Int. Cl.7 .................................. H04N 5/65
(52) U.S. Cl. ................ 348/822; 348/825; 348/836; 361/682
(58) Field of Search .................. 361/682; 349/58; 248/689; 348/836, 552, 822, 825, 818

(56) References Cited

U.S. PATENT DOCUMENTS

| | | | | |
|---|---|---|---|---|
| 4,063,289 A | * | 12/1977 | Veenendaal | 358/242 |
| 5,038,142 A | * | 8/1991 | Flowers et al. | 341/34 |
| 5,587,876 A | | 12/1996 | O'Brien et al. | |
| 5,682,300 A | * | 10/1997 | Sung | 361/817 |
| 5,699,132 A | * | 12/1997 | Adachi et al. | 348/836 |
| 5,990,985 A | * | 11/1999 | Kim | 348/836 |
| 6,018,375 A | * | 1/2000 | Lim | 348/829 |

* cited by examiner

*Primary Examiner*—Lynn D. Feild
(74) *Attorney, Agent, or Firm*—Blakely, Sokoloff, Taylor & Zafman LLP

(57) ABSTRACT

A cathode ray tube (CRT) is housed in an enclosure by using four clamp devices, two wedges and a housing. The clamp devices are located at the corners of the CRT and are secured to the enclosure with screws. The CRT rests on the housing, which is preferably comprised of fixed posts that the CRT rests on top of. The wedges, preferably made of rubber, are placed between the CRT and the enclosure and usually located at the top of the CRT. The clamp devices, housing and wedges are used to secure the CRT in the enclosure.

18 Claims, 6 Drawing Sheets

METHOD AND SYSTEM FOR SUPPORTING A CATHODE RAY TUBE DISPLAY

BACKGROUND OF THE INVENTION

1. Field of the Invention

The present invention relates to cathode ray tube (CRT) displays, and more particularly to a method and system for supporting a cathode ray tube display.

2. Description of the Prior Art

The number of computer systems used for business and personal applications has increased greatly in recent years. Due to the increased use of computer systems, improving methods for manufacturing computer systems have been an issue for computer manufacturers, designers, and distributors. Improved manufacturing methods usually results in lower costs and/or increasing the flexibility of the manufacturing process itself.

Contemporary computer monitors have cathode ray tubes (CRT) secured to the monitor enclosure with screws inserted into boss holes located in the enclosure bezel. This technique is limited, in that potentially destructive forces from impacts are transmitted to very localized regions in the enclosure. Furthermore, this technique does not easily allow for the use of a removable front bezel.

SUMMARY OF THE INVENTION

A cathode ray tube (CRT) is housed in an enclosure by using four clamp devices, two wedges and a housing. The clamp devices are located at the corners of the CRT and are secured to the enclosure with screws. The CRT rests on the housing, which is preferably comprised of fixed posts that the CRT rests on top of. The wedges, preferably made of rubber, are placed between the CRT and the enclosure and usually located at the top of the CRT. The clamp devices, housing and wedges are used to secure the CRT in the enclosure.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

To facilitate an understanding of the present invention, it is described hereinafter in the context of a specific embodiment. In particular, reference is made to the implementation of the invention in a cathode ray tube (CRT) display for a computer system. It will be appreciated, however, that the practical applications of the invention are not limited to this particular embodiment. Rather, the invention can be employed in other types of CRT displays, one example being a television.

Figure 1:
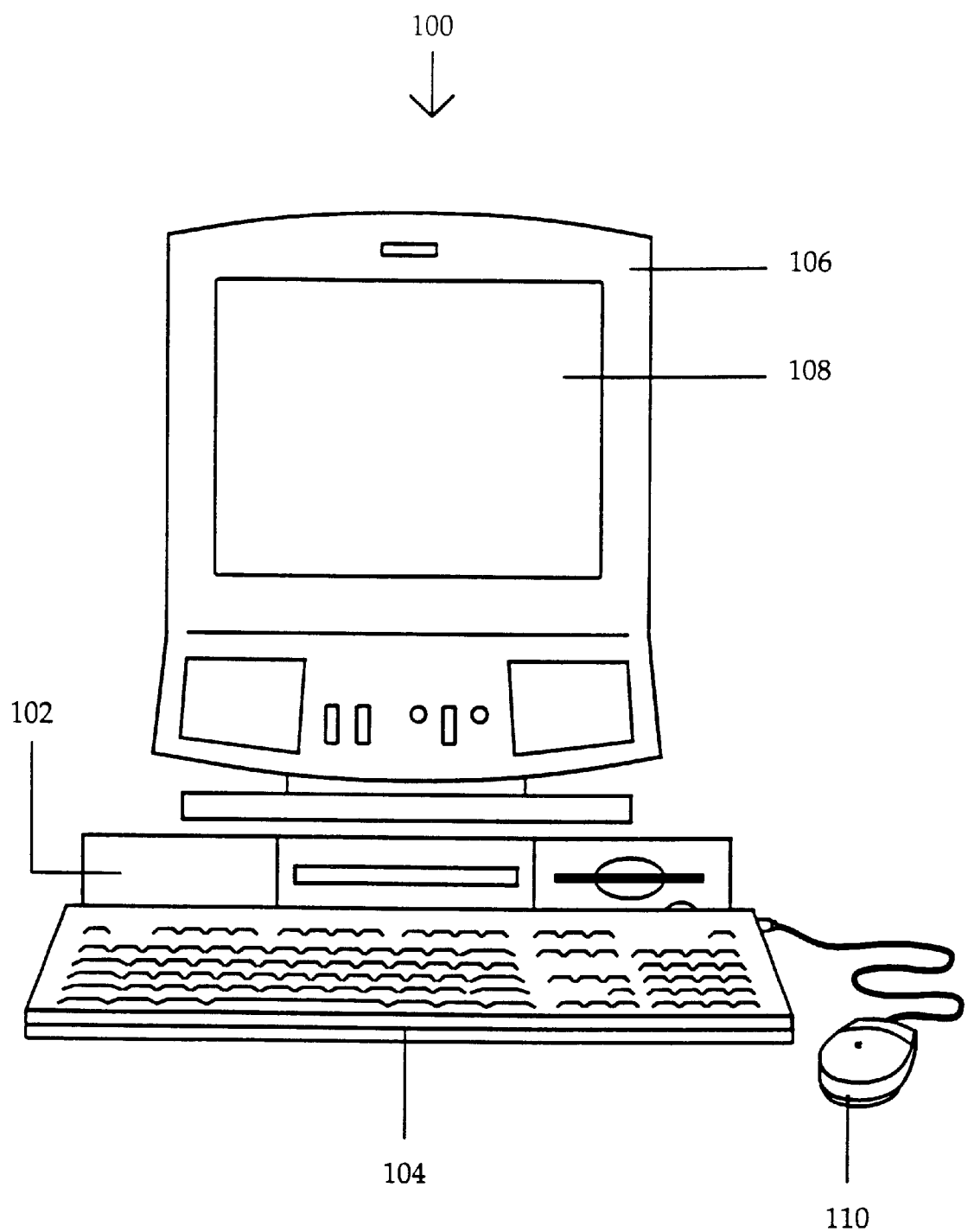
FIG. 1 an exemplary system which can be used to implement a method and system for supporting a cathode ray tube display according to the present invention.

With reference now to the figures and in particular with reference to FIG. 1, an exemplary system which can be used to implement a method and system for supporting a cathode ray tube display according to the present invention is illustrated. System 100 is comprised of a computer 102, keyboard 104, monitor 106 having cathode ray tube (CRT) display 108, and input device 110, shown here as a mouse. Computer 102 can be implemented using a Power Macintosh® 7200 and monitor 106 can be implemented using an AudioVision™ 850 monitor. Both are products of Apple Computer, Inc. located in Cupertino, Calif.

Figure 2:
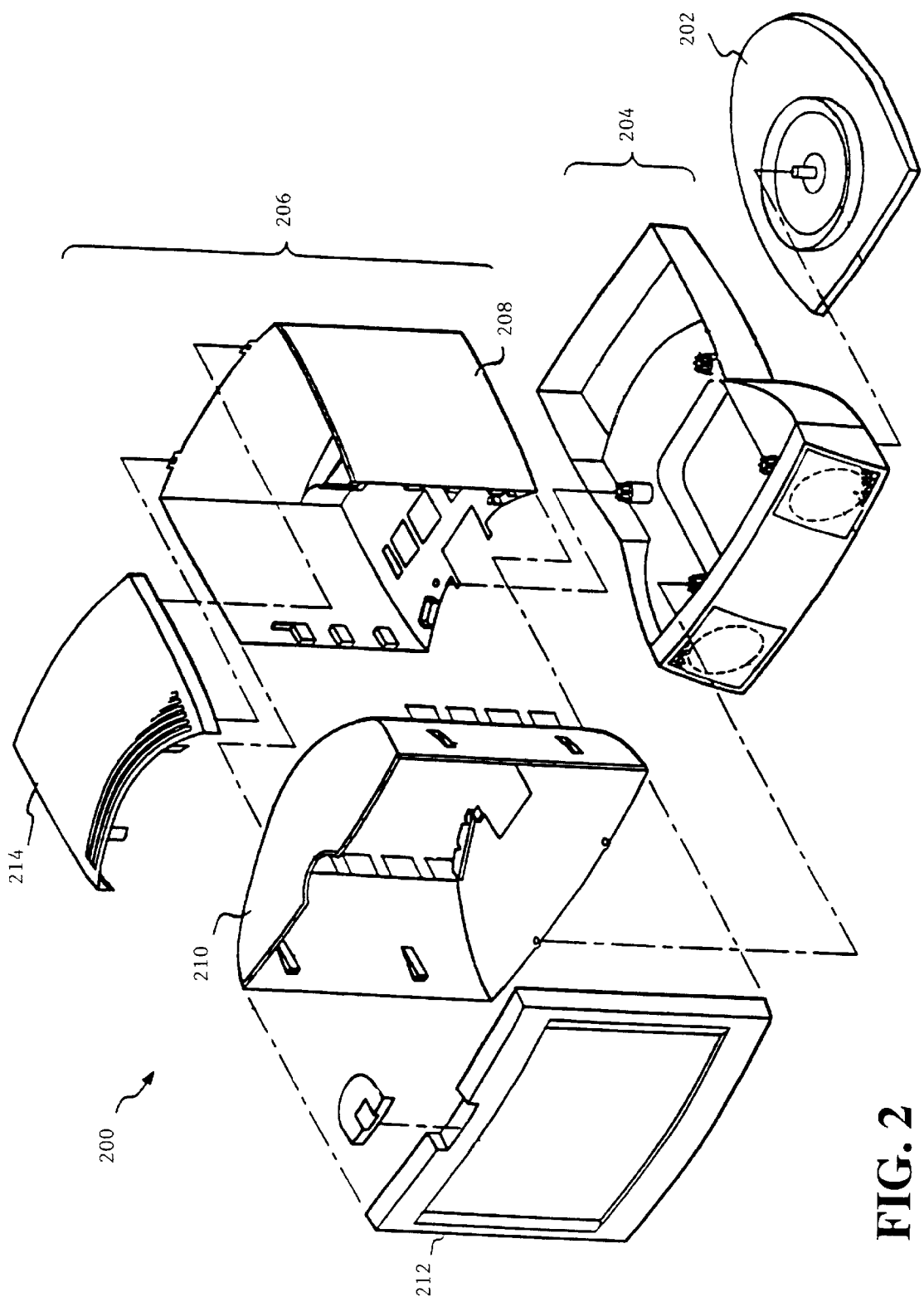
FIG. 2 is an exploded perspective view of an exemplary embodiment of a modular display enclosure according to the present invention.

FIG. 2 is an exploded perspective view of an exemplary embodiment of a modular display enclosure according to the present invention. To simplify the description of the preferred embodiment, only those elements that are necessary to understand the present invention are specified in FIG. 2. The modular monitor architecture 200 begins with base 202. A tilt/swivel module 204 is mounted on top of base 202 by a first attachment means. Base 202 and tilt/swivel module 204 are mounted together such that tilt/swivel module 204 can be tilted and rotated with respect to base 202.

Monitor module 206 is mounted on top of tilt/swivel module 204 preferably in a static manner by a second attachment means such that tilt/swivel module 204 and monitor module 206 will rotate and tilt together when either is moved. Monitor module 206 preferably comprises aft bucket 208, middle bucket 210, bezel 212, and lid 214. Aft bucket 208 and middle bucket 210 are attached together and form an enclosure for CRT display 108 (FIG. 1). Bezel 212 is mounted on the front of middle bucket 210 and secures CRT 108 in aft bucket 208 and middle bucket 210. Lid 214 is attached on the top of aft bucket 208 and also encloses CRT display 108. In the preferred embodiment, aft bucket 208, middle bucket 210, bezel 212, and lid 214 are constructed as single pieces of hardened plastic using an injection molding process. U.S. Pat. No. 5,587,876, entitled "Modular Monitor Architecture," issued Dec. 24, 1996 describes in more detail a modular monitor architecture which can be used to implement the present invention.

Figure 3:
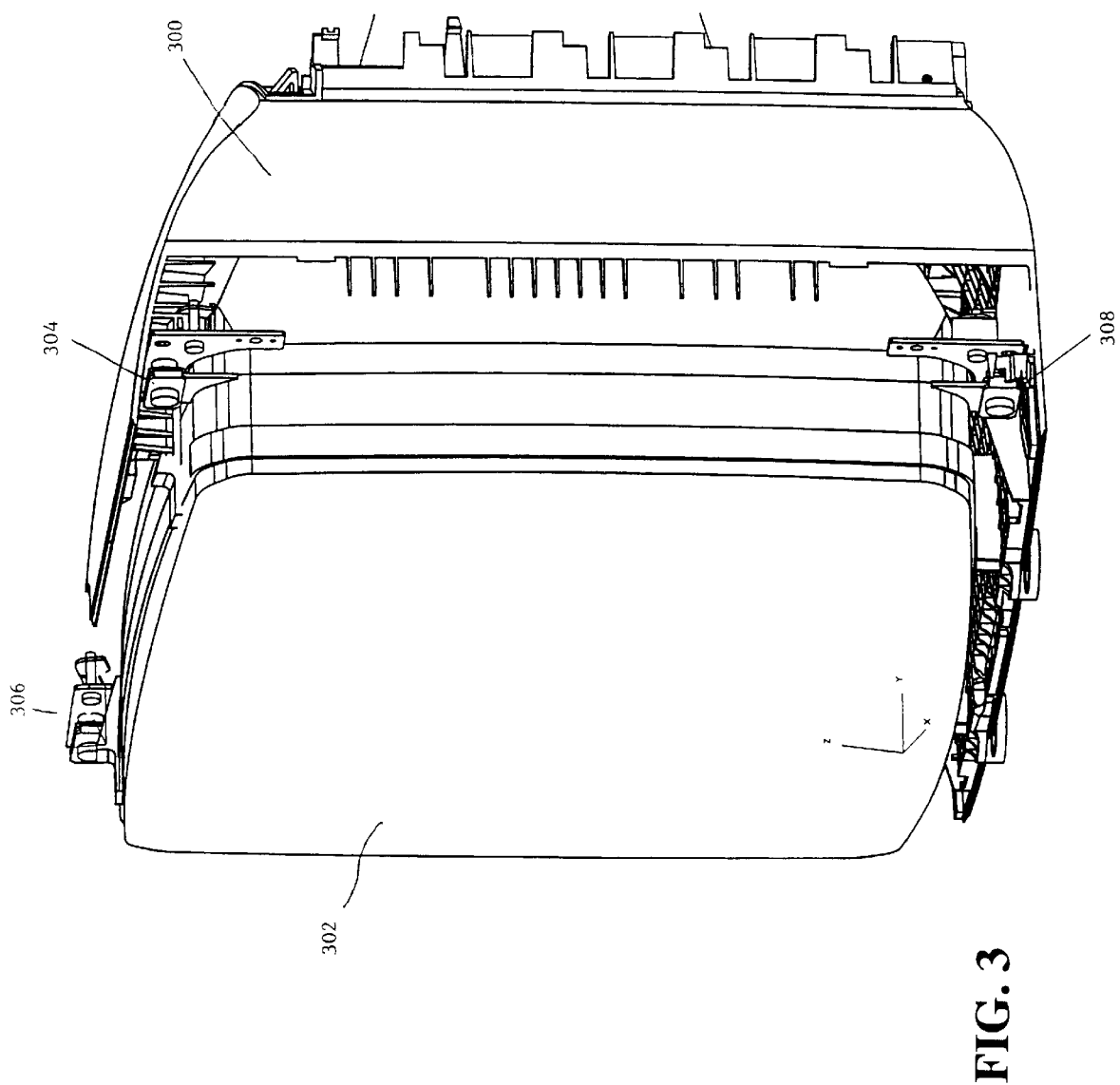
FIG. 3 is a perspective view of a middle bucket of an exemplary modular monitor enclosure housing a cathode ray tube display according to the present invention.

Referring to FIG. 3, a perspective view of a middle bucket in an exemplary modular monitor enclosure housing a cathode ray tube display according to the present invention is shown. Middle bucket 300 surrounds at least a portion of a cathode ray tube (CRT) display 302. CRT 302 is attached to middle bucket 300 by a first clamp device 304, a second clamp device 306, a third clamp device 308, and a fourth clamp device 310 (not shown). Fourth clamp device 310 is located at the lower left side of the CRT. Clamp devices 304, 306, 308, 310 are preferably molded in wedge shapes and are located in transverse support positions to secure CRT 302 against horizontal and vertical travel.

Figure 4:
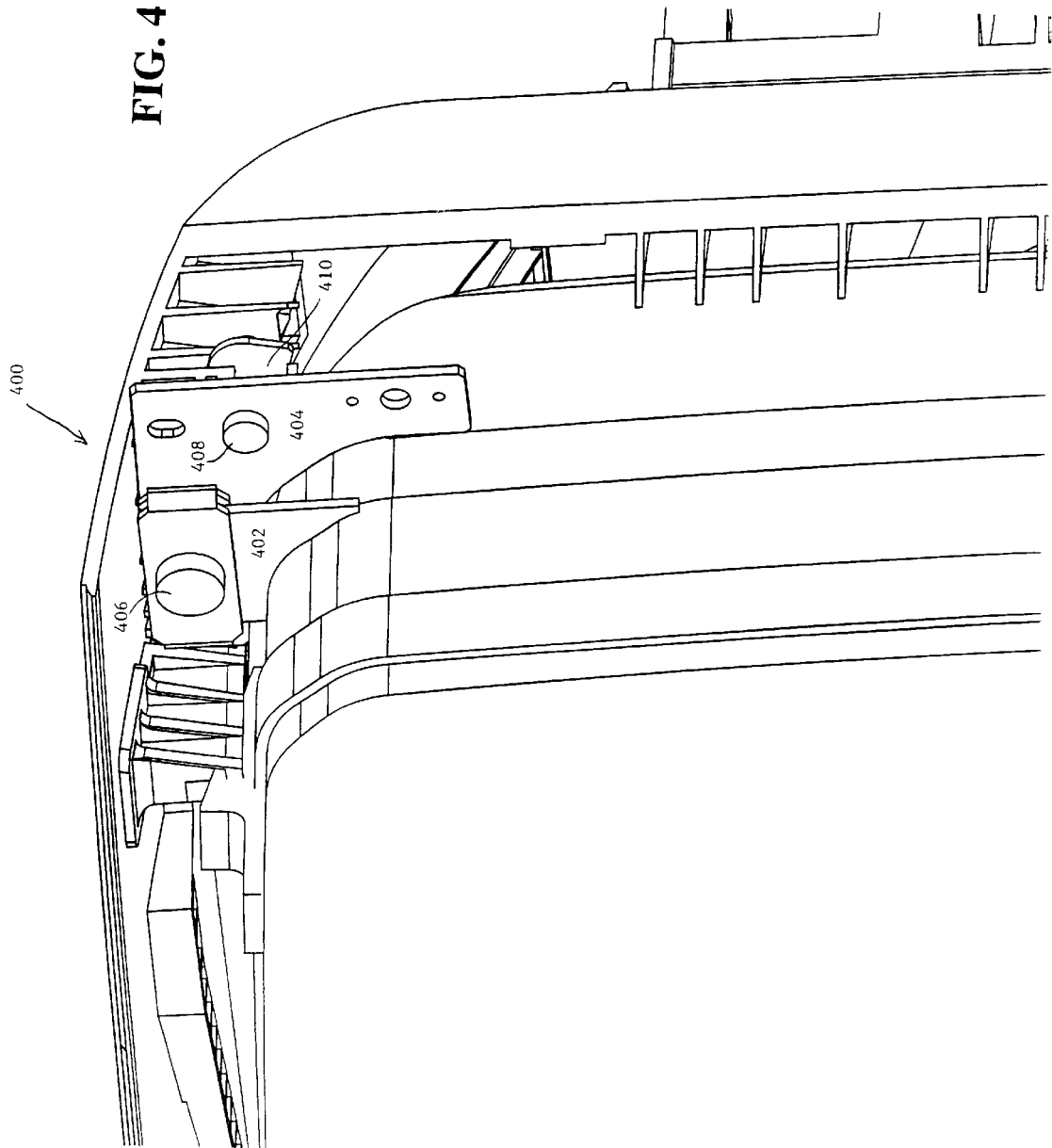
FIG. 4 is a front perspective view of an exemplary clamp device according to the present invention.

FIG. 4 is a front perspective view of an exemplary clamp device according to the present invention. Clamp device 400 is comprised of a first plate 402 and a second plate 404. Both plates are preferably formed in wedge shapes. A first screw 406 is used to hold first plate 402 and second plate 404 together. First screw 406 is preferably inserted into a captive nut (not shown). A second screw 408 is shown and is used to hold clamp device 400 to the enclosure. In the preferred embodiment, eight screws are used like second screw 408; the eight screws hold clamp device 400 to the enclosure. The eight screws are inserted into threaded holes in a third plate 410 formed in the enclosure.

Figure 5:
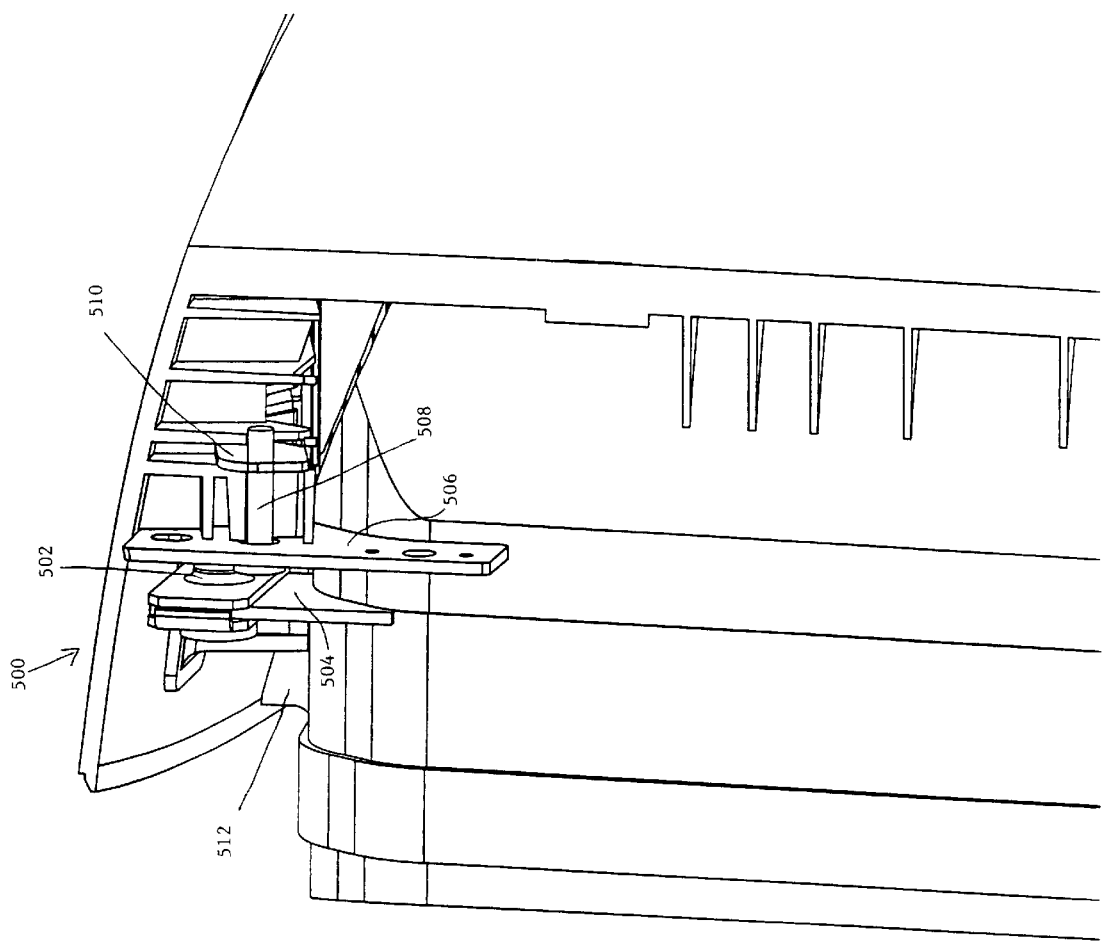
FIG. 5 is a rear perspective view of an exemplary clamp device according to the present invention.

FIG. 5 illustrates a rear perspective view of an exemplary clamp device according to the present invention. As can be seen, A first screw 502 is used to hold first plate 504 and second plate 506 together. A second screw 508 is used to secure clamp device 500 to a third plate 510. As discussed earlier, second screw 508 is preferably one of eight screws used to secure clamp device 500 to third plate 510. Third plate 510 is formed as part of the enclosure, and second screw 508 is inserted into threaded holes in third plate 510. A first wedge 512 is used to secure the CRT and helps prevent shifting by the CRT. Wedge 512 is preferably made of rubber. In the preferred embodiment, a second wedge is located near the second clamp device located at the top of the CRT (not shown).

Figure 6:
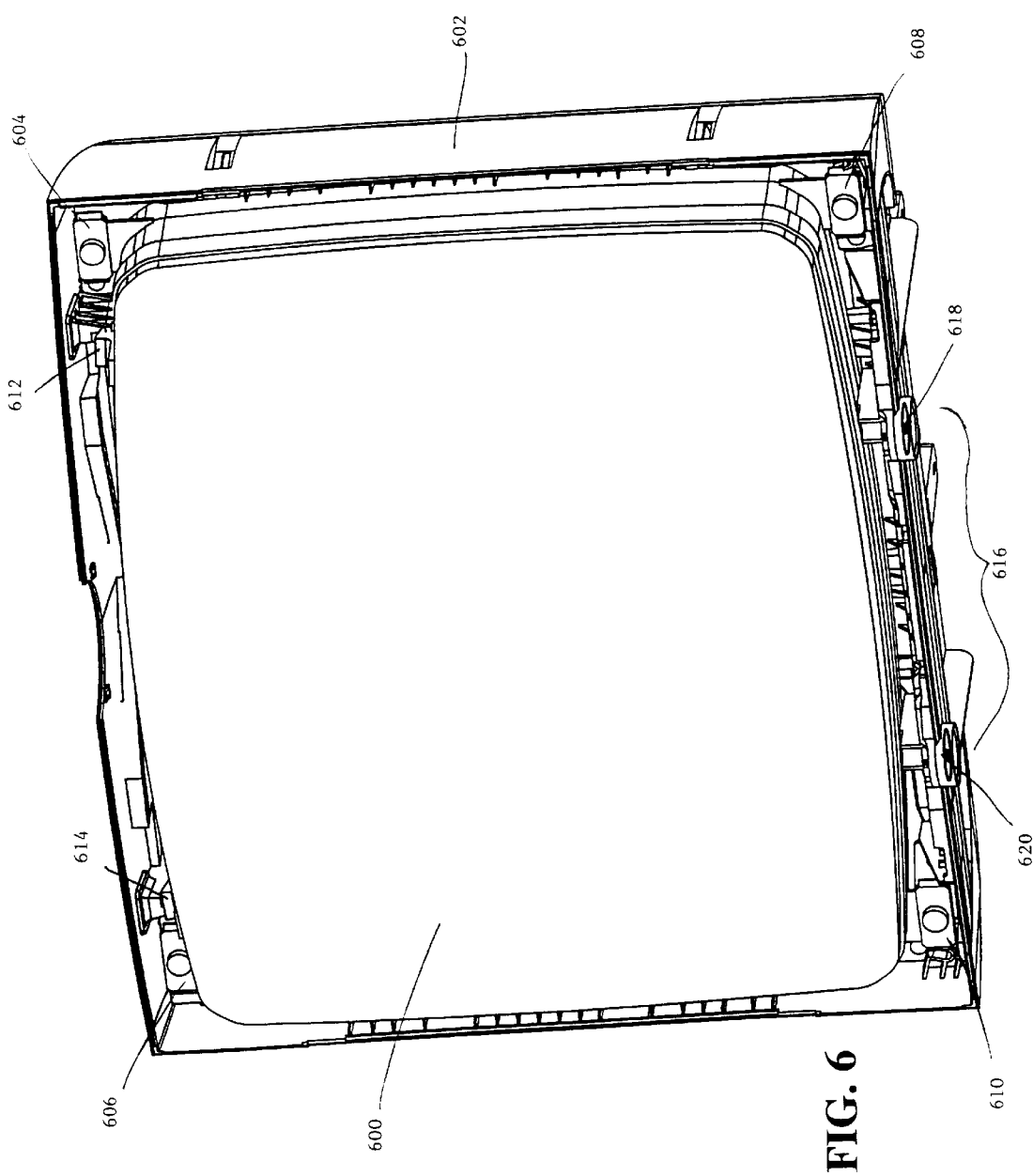
FIG. 6 is a perspective view of an exemplary monitor enclosure housing a cathode ray tube display according to the present invention.

Referring to FIG. 6, a perspective view of an exemplary monitor enclosure housing a cathode ray tube display according to the present invention is shown. CRT 600 is secured in enclosure 602 by first clamp device 604, second clamp device 606, third clamp device 608, and fourth clamp device 610. A first wedge 612 and a second wedge 614, preferably made of rubber, are also used to secure CRT 600 in enclosure 602. And lastly, a housing 616 on the bottom of enclosure 602 is used to secure CRT 600 in enclosure 602. Housing 616 is comprised of fixed posts 618, 620 in the preferred embodiment, and CRT 600 rests on top of fixed posts 618, 620.

One of the advantages of the present invention is that it provides strong support to a CRT and provides for the transfer of loads to a larger area of the enclosure. This reduces the risk of damage to the enclosure when the enclosure is impacted, such as dropped. This also allows for adjustments to the CRT position in the enclosure. In addition, the clamp devices resist shifting by the CRT when the enclosure is placed under shock loads in the vertical direction. Those skilled in the art will appreciate that the clamp devices are not limited to resisting shifting for shock loads in the vertical direction. The clamp devices can be used for shock loads in more than one axis as well. The clamp devices also distribute forces over a larger area of the enclosure than prior art methods. Finally, the method and system of the present invention allows for the use of a removable front bezel and careful control of the spacing of the curved glass and bezel.

While the invention has been particularly shown and described with reference to a preferred embodiment, it will be understood by those skilled in the art that various changes in form and detail may be made therein without departing from the spirit and scope of the invention. For example, one wedge can be used to secure the CRT, or more than two wedges can be used. Alternatively, clamp devices can be made of one plate, or more than two plates. Fasteners other than screws can be used to secure the clamp devices to the enclosure, or to assemble the clamp device. The clamp devices can be located at positions other than the corners of the CRT. And finally, a different type of housing can be used to rest the CRT on top of.

What is claimed is:

1. A computer monitor, comprising:
   an enclosure having an enclosure plate;
   a first clamp device, a second clamp device, a third clamp device, and a fourth clamp device located in said enclosure, each of said clamp devices including a first plate and a second plate secured to the first plate, the second plate being secured to a respective enclosure plate, the first and enclosure plates being independently adjustable relative to the second plate; and
   a cathode ray tube display housed in said enclosure, wherein the first clamp device, the second clamp device, the third clamp device, and the fourth clamp device are each located in a transverse support position so that an edge of each first plate of each clamp device meets with the edges of said cathode ray tube display to support said cathode ray tube display by the edge of each first plate of each clamp device, wherein said cathode ray tube display is positioned adjustably in said enclosure due to said independent adjustability of the plates relative to one another.

2. The computer monitor of claim 1 wherein said first clamp device, said second clamp device, said third clamp device, and said fourth clamp device are located at the corners of said cathode ray tube display.

3. The computer monitor of claim 1 further comprising a housing on the bottom of said enclosure, wherein said housing comprises at least one fixed post.

4. The computer monitor of claim 3 wherein said cathode ray tube display rests on at least one of the fixed pests of said housing.

5. The computer monitor of claim 1 wherein said system comprises at least one wedge.

6. The computer monitor of claim 5 wherein said wedge(s) comprises rubber.

7. The computer monitor of claim 5 wherein said wedge(s) is placed on top of the cathode ray tube display and between said cathode ray tube display and said enclosure.

8. The computer monitor of claim 5 wherein said first clamp device, said second clamp device, said third clamp device, said fourth clamp device, said housing and said wedge(s) are used to secure the cathode ray tube display in the enclosure.

9. The computer monitor of claim 1 wherein said first clamp device, said second clamp device, said third clamp device, and said fourth clamp device are molded in wedge shapes.

10. The computer monitor of claim 1 wherein said fourth clamp device is located at a lower left side of the cathode ray tube display.

11. The computer monitor of claim 1 wherein the first plate and the second plate are formed in wedge shapes.

12. The computer monitor of claim 1 wherein the first plate and the second plate are held together by a first screw.

13. The computer monitor of claim 12 wherein said first plate and said second plate are held together by said first screw and a captive nut.

14. The computer monitor of claim 1 wherein said enclosure plate comprises at least one threaded hole.

15. The computer monitor of claim 14 wherein any of the clamp devices are connected to said enclosure plate of said enclosure using a second screw inserted into said threaded hole.

16. The computer monitor of claim 14 wherein any of the clamp devices are connected to said enclosure plate of said enclosure using at least one screw.

17. The computer monitor of claim 5 wherein said cathode ray tube is secured in said enclosure with a first wedge and a second wedge.

18. The computer monitor of claim 17 wherein said first wedge and said second wedge comprise rubber.

\* \* \* \* \*